Oct. 4, 1966 M. F. TOOHIG ETAL 3,277,334
CHARGE STORAGE TUBE AND TARGET ELECTRODE THEREFOR
Filed Sept. 19, 1962

INVENTORS
MICHAEL F. TOOHIG
EDWARD H. EBERHARDT
BY Percy P. Lantzy
ATTORNEY.

United States Patent Office 3,277,334
Patented Oct. 4, 1966

3,277,334
CHARGE STORAGE TUBE AND TARGET ELECTRODE THEREFOR
Michael F. Toohig and Edward H. Eberhardt, Fort Wayne, Ind., assignors to International Telephone and Telegraph Corporation, Nutley, N.J., a corporation of Maryland
Filed Sept. 19, 1962, Ser. No. 224,724
5 Claims. (Cl. 315—12)

This invention relates generally to charge storage tubes and the target or storage electrode therefor.

A storage tube is a device wherein input information, either in the form of an optical image or an electrical signal, is "written" onto a storage electrode in the form of a charge pattern corresponding to the input information, and subsequently "read out" either in the form of an optical image or an electrical output signal. There are four distinct varieties of charge storage tubes: the storage image tube which has an optical input and optical output, the storage camera tube which has an optical input and electrical output, the signal-to-signal tube, such as the barrier grid storage tube or the scan conversion tube which has an electrical input and electrical output, and the storage cathode ray tube which has an electrical input and optical output.

Among the requirements of all storage tubes are high sensitivity, long storage and the capability of multiple read-outs, i.e., a nondestructive read-out. An addional requirement of electrical output storage tubes may be the provision of output signal characteristics independent of scanning speed. These requirements have been generally satisfied by the employment of a perforate storage electrode assembly comprising a fine mesh metal screen having high resistance secondary-emissive dielectric material deposited on the one side thereof facing the source of the electron image. With this arrangement, read-out of the charge pattern is provided by directing a stream of low velocity electrons toward the storage electrode, this stream being transmission modulated by the elemental charges on the dielectric material to provide the nondestructive read-out.

In the past, it has been difficult to obtain the desired sensitivity in such charge storage tubes employing a perforate storage electrode due to the relatively high charging capacitance from the front surface of the dielectric material to the metal screen and it is therefore desirable to decrease this capacitance in order to increase the charging rate of the electrode and thus the sensitivity of the tube. Attempts have been made to decrease the charging capacitance by increasing the thickness of the dielectric layer, for example by employing a sheet of Fotoform glass having etched openings therein and with a metal screen abutting one side, or by merely increasing the thickness of the dielectric material deposited on the metal screen as by evaporation. While the front-to-back capacitance of such a thickened storage electrode has been decreased, it has been at the expense of the optical transmissivity of the electrode, i.e., the open area compared with the total area. Further, such methods of thickening the dielectric layer have introduced problems of wall charging, i.e., charging of the interior walls of the apertures in the electrode.

It is accordingly an object of the invention to provide an improved perforate charge storage electrode for a charge storage tube wherein the front-to-back charging capacitance is reduced without adversely affecting the optical transmission of the electrode and without introducing objectionable wall charging.

In accordance with the invention, the front-to-back capacitance of the perforate charge storage electrode is reduced without reducing the optical transmission or increasing wall charging by separating the dielectric screen from the metal screen, i.e., employing a thin, unsupported fine mesh dielectric screen with a fine mesh metal screen closely spaced therefrom.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
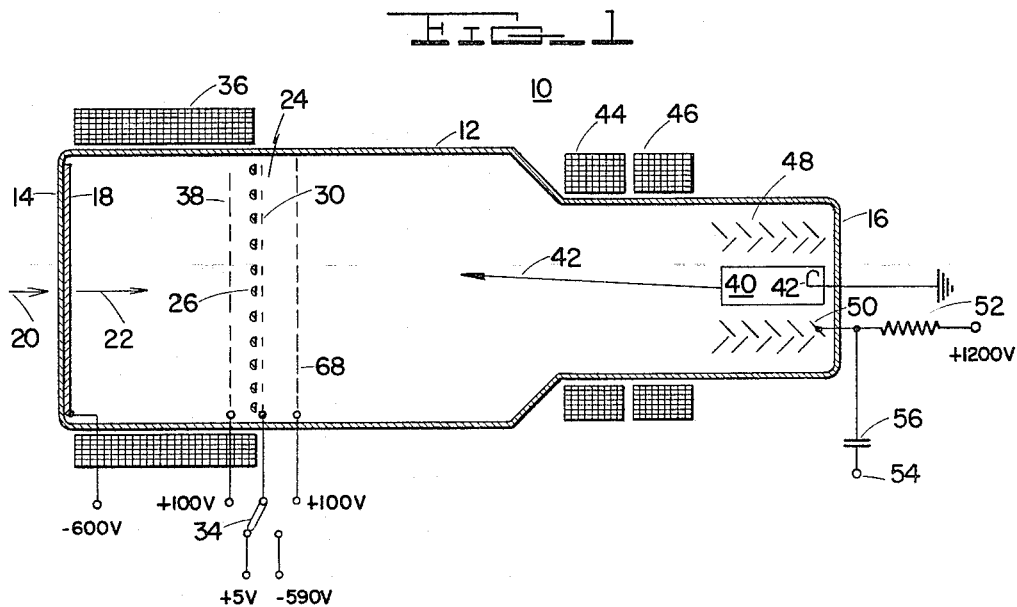
FIG. 1 is a schematic illustration of a storage camera tube incorporating the invention.
Figure 2:
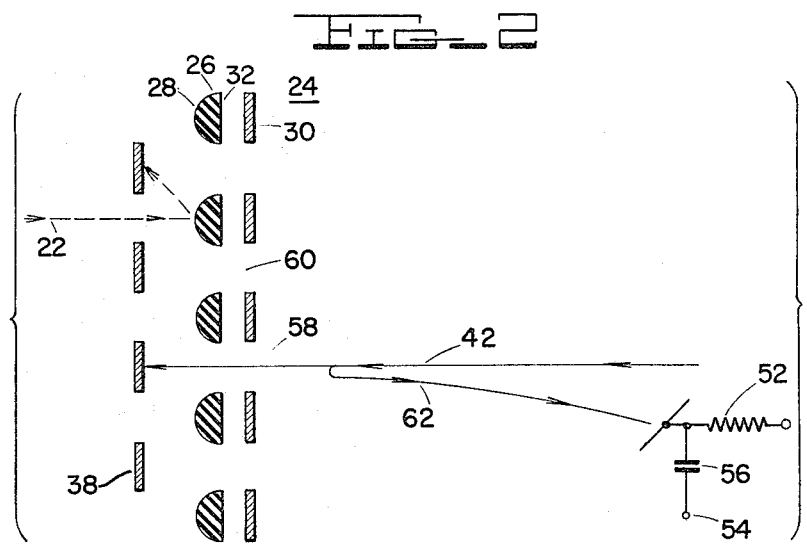
FIG. 2 is an enlarged fragmentary cross-sectional view of the improved storage electrode of the invention.
Figures 3, 4:
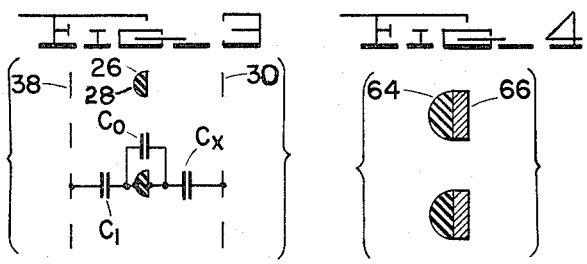
FIG. 3 is a schematic view showing the relative capacitances of the elements of the storage electrode of FIGS. 1 and 2.
FIG. 4 is a fragmentary cross-sectional view showing a step in the method of fabricating the dielectric screen.

Referring now to FIGS. 1, 2 and 3 of the drawings, there is shown by way of illustration a storage camera tube, generally indicated at 10, having an enclosing evacuated envelope 12 with opposite ends 14 and 16. A conventional photocathode 18 is deposited on the interior of end 14 of envelope 12 for receiving an input optical image, shown by the arrow 20, and for providing an electron image in response thereto, as shown by the arrow 22.

A storage or target electrode assembly 24 is provided extending transversely across envelope 12 between ends 14 and 16. Target electrode assembly 24 comprises a fine mesh screen 26 formed of secondary-emissive dielectric material having one side 28 facing the photocathode 18, and a fine mesh metal screen 30 closely spaced from the other side 32 of the dielectric screen 26. In the illustrated embodiment, the photocathode 18 is connected to a suitable source of potential such as —600 volts, and the metal screen 30 is selectively connected by a suitable switch 34 to a suitable source of potential, such as +5 volts, so that the electron image 22 emitted by the photocathode 18 is directed toward the storage electrode 24 so as to impinge upon the side 28 of the dielectric screen 26. A suitable focusing coil 36 is provided surrounding envelope 12 between photocathode 18 and the storage electrode 24 for focusing the electron image 22 onto the dielectric screen 26.

A suitable secondary electron collector electrode 38 is provided in the envelope 12 between photocathode 18 and the dielectric screen 26 and is connected to a suitable source of potential, such as +100 volts. With this arrangement, the secondary electrons emitted from the front side 28 of the dielectric screen 26 responsive to impingement of the electron image 22 thereon are attracted to the collector electrode 38 with the result that a charge pattern is formed on the front side 28 of dielecric screen 26 with reference to the metal screen 30 corresponding to the electron image 22.

A conventional electron gun 40 is positioned within envelope 12 adjacent the other end 16 and is arranged to direct an electron beam 42 toward storage electrode 24. Electron gun 40 includes conventional beam forming and accelerating electrodes and a suitable cathode 41 which is connected to a suitable source of potential, shown here as being ground, so that electron beam 42 is directed with low velocity toward the metal screen 30. Suitable, vertical and horizontal deflection coils 44 and 46 respectively are provided for scanning the beam 42 over the metal screen 30 in a conventional raster pattern.

A conventional secondary emission multiplier 48 is provided in the envelope 12 surrounding gun 40 and has its final dynode 50 connected to a suitable source of potential, such as +1200 volts by a load resistor 52. Output circuit 54 is coupled to the output dynode 50 by a suitable coupling capacitor 56.

Referring particularly to FIG. 2, as the low velocity electron beam 42 is scanned over the metal screen 30, a portion thereof shown by the arrows 58 will pass through the openings 60 in the dielectric screen 26 and metal screen 30 to the collector electrode 38, and another portion 62 will be reflected by the elemental charges on the dielectric screen surrounding the particular opening 60, the proportion of electrons 58 passing through the screen and the electrons 62 being reflected rearwardly back toward electron gun 40 being proportional to the elemental charge. The reflected stream of electrons 62 is attracted to the secondary electron multiplier 48 and provides a current flow in load resistor 52 proportional thereto and thus to the elemental charge on a particular area of dielectric screen 26. It will thus be seen that as the low velocity electron beam is repetitively scanned over the metal screen 30, a time-based signal is developed in the output circuit 54 corresponding to the charge pattern on the dielectric screen 26.

In accordance with the invention, the dielectric screen 26 is supported around its perimeter in any conventional manner so that it is electrically isolated from the metal screen 30. Thus, as shown in FIG. 3, the incremental capacitance between the front side 28 of dielectric screen 26 and the metal screen 30 is the capacitance $C_0$ (between the front and back sides 28, 32 of the dielectric screen 26) plus the capacitance $C_x$ (between the back side 32 of dielectric screen 26 and the metal screen 30). It is important that the metal screen 30, referred to as the "box" screen, be positioned at a controlled spacing from the dielectric screen 26. The capacitance $C_x$ will be appreciably more than the capacitance $C_1$ between the collector screen 38 and the front side 28 of the dielectric screen 26. It will be seen that the dielectric screen 26 is floating with respect to the metal screen 30 and that the front-to-back capacitance of the storage electrode assembly 24 may thus be substantially reduced over prior constructions of the same front-to-back spacing wherein the dielectric layer is directly deposited on or directly in engagement with a metal backing screen.

With the invention, the requisite low front-to-back capacitance may be provided with a dielectric screen 26 of minimum thickness which is still self-supporting, thus not adversely affecting the optical transmission of the storage screen assembly or introducing objectional wall charging. In a typical storage tube having a storage electrode diameter of 3 inches, the spacing between the back side 32 of the dielectric screen 26 and the metal screen 30 may be between two (2) and six (6) mils, the dielectric screen 26 may have a thickness of two (2) microns and the metal screen 30 may have a thickness of one-half (½) mil. In such a construction with both the dielectric screen 26 and the metal screen 30 having a mesh of 250 to 500 per linear inch, the optical transmissivity is on the order of 50%, whereas the optical transmissivity of a Fotoform glass screen of comparable mesh and 2 mils thick is from 10% to 25%.

Referring now to FIG. 4, the unsupported dielectric screen 26 may be formed by evaporating a thin layer 64 of the desired dielectric material such as aluminum oxide (AlO), silicon iron-oxide (SiO), or magnesium fluoride ($MgF_2$) onto a fine mesh metal screen 66, such as copper, and then etching away the copper with a suitable etchant, thus leaving the unsupported dielectric screen 26.

In order to erase the charge pattern from the front side 28 of the dielectric screen 26, switch 34 may selectively connect the metal screen 30 to a suitable source of potential, such as −590 volts, or in the alternative the photocathode 18 may be selectively connected to a suitable source of potential, such as −10 volts, so that the photocathode 18 is only slightly negative with respect to the metal screen 30.

In the illustrated embodiment, a conventional field electrode 68 is provided between the metal screen 30 and the electron gun 40 and connected to a suitable source of potential, such as 100 volts, for providing the electron optics for the electron beam 42.

While the improved storage screen assembly 24 of the invention has been illustrated and described as embodied in a storage camera tube, it will be readily understood that it is equally suitable for employment in the other three types of storage tubes, i.e., an image storage tube, a signal-to-signal storage tube, or a storage display tube.

While we have described above the principles of our invention in connection with specific apparatus, it is to be clearly understood that this description is made only by way of example and not as a limitation to the scope of our invention.

What is claimed is:

1. A charge storage camera tube comprising: an enclosing envelope; photocathode means in said envelope for forming an extended area electron image responsive to an input optical image; a perforate target electrode comprising a fine mesh self-supporting screen formed of secondary-emissive dielectric material in said envelope having one side facing said electron image forming means, means including a fine mesh metal screen closely spaced from the other side of said dielectric screen and means applying a potential between said metal screen and photocathode to cause said electron image to impinge on said one side; means including a secondary-emission collector electrode in said envelope between said one side of said dielectric screen and said electron image forming means and means applying a potential to said collector electrode to attract said secondary electrons emitted from said dielectric screen whereby a charge pattern corresponding to said electron image is formed on said one side of said dielectric screen; and means for directing a low velocity electron beam toward said target electrode whereby a part of said beam passes through said dielectric screen and the remainder is reflected therefrom responsive to the elemental charges thereon to thereby read-out said charge pattern.

2. A charge storage camera tube system comprising: an enclosing envelope; photocathode means in said envelope for forming an extended area electron image responsive to an input optical image; a perforate target electrode comprising a fine mesh self-supporting screen formed of secondary-emissive dielectric material in said envelope having one side facing said electron image forming means and spaced therefrom, and a fine mesh metal screen closely spaced from the other side of said dielectric screen; a first source of potential coupled to said photocathode means and a second source of potential coupled to said metal screen, said first and second sources of potential being proportioned so that said electron image impinges on said one side of said dielectric screen; a secondary-emission collector electrode in said envelope between said electron image forming means and said one side of said dielectric screen and spaced therefrom; a third source of potential coupled to said collector electrode and proportioned so that secondary electrons emitted from said one side of said dielectric screen responsive to impingement of said electron image thereon are attracted toward said collector electrode whereby a charge pattern is formed on said one side of said dielectric screen corresponding to said electron image; and means for directing a low velocity electron beam toward said dielectric screen whereby a part of said beam passes through said dielectric screen and the remainder is reflected therefrom responsive to the elemental charges thereon to thereby readout said charge pattern.

3. The system of claim 2 wherein said second potential is close to ground and said first potential is highly negative with respect thereto, and wherein said third potential is positive with respect to said second potential.

4. The system of claim 3 further comprising switching means for selectively connecting one of said electron image forming means and metal screen to a fourth source of potential proportioned so that said metal screen is slightly positive with respect to said electron image forming means thereby to erase said charge pattern from said dielectric screen.

5. The system of claim 2 wherein the capacitance between said dielecric screen and said metal screen is substantially more than the capacitance between said dielectric screen and said collector electrode.

References Cited by the Examiner
UNITED STATES PATENTS

| | | | |
|---|---|---|---|
| 2,747,133 | 5/1956 | Weimer | 313—67 X |
| 2,765,422 | 6/1956 | Henderson | 313—67 X |
| 2,998,541 | 8/1961 | Lempert | 313—68 X |

DAVID J. GALVIN, *Primary Examiner.*